United States Patent Office 3,006,894
Patented Oct. 31, 1961

3,006,894
PROCESS FOR POLYMERIZING A VINYLIDENE COMPOUND IN THE PRESENCE OF AN ALKALI CATALYST
Evan Franklin Evans, West Chester, Pa., and Lester David Grandine, Jr., Wilmington, Del., assignors to E. I. du Pont de Nemours and Company, Wilmington, Del., a corporation of Delaware
No Drawing. Filed July 12, 1957, Ser. No. 671,387
11 Claims. (Cl. 260—63)

This invention relates to a chemical process. More particularly it is concerned with a novel and useful process for the polymerization of vinylidene monomers.

Anionic polymerization processes for ethylenically unsaturated monomers are well known in the art. Thus, United States Patents 2,608,554 and 2,608,555 refer to such a polymerization reaction in which extremely basic catalysts are used. Anionic polymerizations are characterized by high speed of reaction, good conversion rate, and a high degree of polymerization. However, anionic catalytic systems generally produce discolored polymer and frequently lead to cross-linked products of little or no value.

It is an object of the present invention to provide a novel and useful polymerization process.

Another object is to provide a process for the preparation of a polymer solution directly from its monomer without intermediate separation of the solid polymer.

These and other objects will become apparent in the course of the following specification and claims.

In accordance with the present invention, a process is provided for polymerizing a vinylidene monomer of the class consisting of

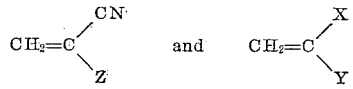

wherein X is a monovalent radical with a σ * number above about 0.70, Y is a member of the class consisting of hydrogen, lower alkyl and phenyl and Z is a member of the class consisting of hydrogen and phenyl, the said monomer being free of acidic substituents, which comprises contacting the said monomer, dissolved in a liquid which acts as a solvent for the polymer to be formed, with an alkaline salt of an acid having a $pK_a$ at room temperature of between about 7 and about 15. The reaction is conducted at a low temperature. Since it is exothermic in nature, its course can be followed by the temperature variations. The alkaline salt which acts as initiator for the reaction is employed in minor amounts. Generally the weight ratio of active initiator to monomer is within the limits of from about 1:10,000 to about 1:200 for the production of high molecular weight polymers. By "active" initiator is meant initiator soluble in the solvent of the polymerization system. An initiator with a solubility as low as about 0.001% based on the weight of solvent is effective. The presence of excess undissolved initiator has no deleterious effect on the process.

By a σ * number is meant the reactivity of the radical as calculated from the Hammett equation and computed as "special reactivity" by Jaffé ("Chemical Review," 53, 191–261; 1953). Preferably the radical—X of the formula is a member of the class consisting of

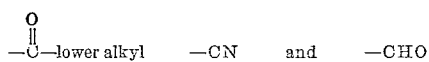

Since vinylidene monomers bearing acidic substituents act as chain transfer agents, such monomers are excluded from the generic monomeric expression previously defined.

The following examples are cited to illustrate the invention. They are not intended to limit it in any manner. In each example, freshly distilled vinylidene monomer and a water free system is employed. Inherent viscosities (I.V.) are measured as a 0.5% solution in dimethylformamide unless otherwise indicated. Unless otherwise noted, each example employs 8.0 grams (10 cc.) of acrylonitrile monomer (σ * of $CN^-$=1.000), 47.2 grams (50 cc.) of freshly distilled dimethylformamide as solvent and a blanket of nitrogen. Each reaction mixture is stirred over the course of the reaction. When a maximum temperature is reached, the resulting solution is acidified to neutralize the initiator. The polymer, when separated, is precipitated in a non-solvent (usually water or petroleum ether) washed with acetone and dried in a forced draft at about 70° C.

In Examples 1 to 3 below, a large excess of potassium cyanide ($pK_a$ of HCN, 9.1) is employed as initiator, which due to the solubility of the initiator results in an estimated ratio of monomer to active initiator of 10,000:1 (monomer:initiator). In each of these examples, the initial temperature of the system of reactants is —60° C. During the reaction, the temperature of the system increases 35 to 40° C. In Example 1, a crystalline potassium cyanide is used, whereas in Examples 2 and 3, the initiator is powdered. In Examples 1 and 2, the initiator is added to the cold stirred solution of monomer, whereas in Example 3 the order is reversed. Observations are reported in Table I.

TABLE I

| Example | Induction period (min.) | Reaction period (sec.) | I.V. | Yield (percent) |
|---|---|---|---|---|
| 1 | 16 | 30 | 2.38 | 93 |
| 2 | 5 | 45 | 2.33 | 96 |
| 3 | 6.5 | 75 | 2.05 | 95 |

The technique of Example 1 is followed in Examples 4 to 14, except that the initiator in Examples 5 to 14 is added as a saturated solution in the system solvent. As shown in Table II, these examples illustrate typical variations of initiator, monomer, monomer to initiator ratio and reaction temperature. In each case, a short induction period is noted. The reaction rate varies but is usually very rapid.

TABLE II

| Example | Initiator | pK$_a$ of initiator [1] | Ratio M:I [2] | Initial temp. (° C.) | Final temp. (° C.) | I.V. | Yield (percent) |
|---|---|---|---|---|---|---|---|
| 4 | Sodium cyanide | 9.1 | [3] 10,000:1 | −52 | −6 | 2.44 | 100 |
| 5 | do | 9.1 | [3] 10,000:1 | −45 | −3 | 2.53 | 95 |
| 6 [4] | Sodium sulfide | 14.9 | 2,000:1 | −52 | +5 | 3.08 | 62 |
| 7 [4] | Sodium hydrosulfide | 7.04 | 2,000:1 | −29 | +24 | 3.12 | 91 |
| 8 [4] | Sodium phenoxide | 9.89 | 2,000:1 | −35 | 0 | 1.29 | 44.3 |
| 9 [4] | Potassium phthalimide | 7.4 | 5,000:1 | −30 | | 2.30 | 54.5 |
| 10 [5] | Sodium sulfide | 14.9 | 2,100:1 | −35 | −10 | 0.24 | 79.5 |
| 11 [5] | Sodium cyanide | 9.1 | 700:1 | −35 | −10 | 0.24 | 100 |
| 12 | Sodium sulfide | 14.9 | 1,200:1 | +5 | +17 | 1.93 | 55 |
| 13 [6] | Sodium cyanide | 9.1 | 700:1 | −36 | | | 47.5 |
| 14 [6] | Sodium sulfide | 14.9 | 2,800:1 | −25 | | | 34.7 |

[1] I.e., pK$_a$ of conjugate acid.
[2] Monomer:Initiator (active).
[3] Estimated.
[4] Similar results when dimethylformamide replaced by dimethylacetamide.
[5] 8.3 grams methacrolein ($\sigma^*$ of 1.126) used as monomer. Product precipitated in petroleum ether.
[6] 8.6 grams methyl vinyl ketone ($\sigma^*$ of 0.874) used as monomer. Temperature rises abruptly at start, then levels off. Product soluble in acetone and useful in preparing films and coatings.

In Examples 15 to 19 the technique of Example 4 is followed except that the initial system is −40° C. The amount of initiator (sodium cyanide) present is varied as shown in Table III. A 100% yield is obtained in each example. The table shows that variation of initiator concentration in a given system affects the inherent viscosity of the product.

TABLE III

| Example | Initiator (grams.) | Ratio M:I | I.V. |
|---|---|---|---|
| 15 | 0.00245 | 3,266:1 | 3.13 |
| 16 | 0.0049 | 1,633:1 | 1.67 |
| 17 | 0.0098 | 816:1 | 1.05 |
| 18 | 0.0245 | 372:1 | 0.60 |
| 19 | 0.049 | 163:1 | 0.38 |

Varying the concentration of monomer in any given system affects yield but has little effect on inherent viscosity within the limits of the invention. This is illustrated in Examples 20–23 inclusive, below. The technique of Example 4 is followed (but temperature of initial system of −70° C.) using 0.00363 gram of sodium cyanide as initiator. A final temperature of +60° C. is reached.

TABLE IV

| Example | Monomer (grams) | Ratio M:I | I.V. | Yield (percent) |
|---|---|---|---|---|
| 20 | 7.9 | 2,176:1 | 2.60 | 100 |
| 21 | 12.0 | 3,306:1 | | 98 |
| 22 | 15.8 | 4,352:1 | 2.62 | 88 |
| 23 | 19.8 | 5,454:1 | | 88 |

A chain transfer agent may be employed to limit the molecular weight of the final polymer. Examples 25 to 30 in Table V illustrate the use of various amounts of acetanilide as chain transfer agent additive. Example 24 is a comparative control using no chain transfer agent. In each example 0.0049 gram of sodium cyanide is used as initiator with 7.95 grams of acrylonitrile monomer (a monomer to initiator ratio of 1622:1). Yields in each example are at least 95%. An initial system temperature of −30° C. is employed.

TABLE V

| Example | Acetanilide (grs.) | I.V. | Mol. weight |
|---|---|---|---|
| 24 | 0 | 3.50 | 900,000 |
| 25 | 0.00203 | 2.53 | |
| 26 | 0.00405 | 1.73 | |
| 27 | 0.02025 | 1.09 | 140,000 |
| 28 | 0.04050 | 0.85 | |
| 29 | 0.06075 | 0.77 | 79,000 |
| 30 | 0.10125 | 0.57 | |

The process of the present invention is particularly useful in the preparation of polymer solutions which may be employed directly in the production of yarn by dry spinning. The production of a yarn from a polymer produced by the process of the present invention is shown in Example 31.

*Example 31*

A solution of polymer suitable for spinning is produced continuously from a solution of 0.46 gram of sodium cyanide in 3609 grams of dimethylformamide, cooled to −40° C. and pumped into a pre-mixer at a rate of 0.688 gram per second simultaneously with a solution of 981 grams of acrylonitrile in 2432 grams of dimethylformamide, cooled to −50° C. and pumped into the mixer at a rate of 4.12 grams per second. Upon neutralization of the initiator in a Reed mixer a clear solution containing 14.4% polyacrylonitrile (58% conversion) having an inherent viscosity of 2.88 is obtained. This solution is concentrated to 16% solids and is thereafter extruded through a 10-hole spinneret with an orifice diameter of 6.5 mils at a head temperature of 120° C., an air temperature of 176° C. and a column temperature of 180° C. with a pressure of 95 p.s.i. A white filament is withdrawn from the spinneret with a spin stretch factor of 3.1 and is found to have a cross-section of curled dog bone. It is drawn 4 times its extruded length at a steam pressure of 11 p.s.i. The filament has the properties listed under (A) of Table VI below.

The same filament is drawn 8 times its extruded length under a steam pressure of 40 p.s.i. and relaxed 8% in boiling water directly after drawing. The properties of this white fiber are given under (B) of Table VI.

TABLE VI

| | (A) | (B) |
|---|---|---|
| Denier | 3.3 | 1.5 |
| Straight, dry: | | |
| Tensile strength $T_s$, g.p.d | 2.8 | 4.4 |
| Elongation $E_s$, percent | 25 | 15 |
| Initial modulus $M_i$, g.p.d | 70 | 86 |
| Loop, dry: | | |
| Tensile strength $T_e$, g.p.d | 1.1 | 1.1 |
| Elongation $E_e$, percent | 7.3 | 2.1 |
| $T_e/T_s$ | 0.39 | 0.25 |
| $E_e/E_s$ | 0.29 | 0.14 |

Using a 24% solution of acrylonitrile in the above polymerization, the solids content of the polymer solution increases to 18.6%. At higher acrylonitrile solution concentrations, the concentration of polymer in the final solution tends to decrease.

The process of the present invention is preferably carried out with a weight ratio of active initiator to monomer of about 1:10,000 to about 1:200 when high molecular weight polymers are desired. In other words, only an extremely small amount of initiator is necessary to induce the anionic polymerization. Thus, compounds with very little solubility in the solvent are nevertheless well suited to initiate the polymerization. Suitable initiators are the salts of weak acids within the $pK_a$ range of from about 7 to about 15. Among these are alkali or alkali earth cyanides, alkali or alkali earth sulfides or hydrosulfides, alkali phenoxide, alkali phthalamide, organic quaternary ammonium hydroxides, alkali hydroxides, alkali mercaptides, alkali thiophenoxides, alkali succinimides, alkali dimercaptides, alkali diphenoxides, etc. All these salts initiate the polymerization of monomers free of acid substituents and with $\sigma^*$ numbers for the radical above about 0.70 when the salts are soluble in the reaction solvent to an extent of at least 0.001%.

Among suitable vinylidene monomers which can be polymerized by the present process are acrylonitrile, acrolein, methacrolein, methyl vinyl ketone, ethyl vinyl ketone, nitroethylene, α-phenylacrylonitrile and the like.

The preferred solvents in which the process of the present invention is carried out are those which form a homogeneous system for monomer, polymer and initiator. Dimethylformamide, dimethylacetamide and dimethylsulfoxide are typical of such solvents. Generally any solvent for the monomer, free of active hydrogen (i.e., those solvents with a $pK_a > 25$) and with sufficient solubility for the initiator may be used.

In the process of the present invention, any compound with a $pK_a$ between 7 and 25, tends to act as a chain transfer agent, i.e., polymerizations carried out in their presence will produce lower molecular weight polymers than will be obtained in their absence in otherwise identical polymerizations. A minor amount of chain transfer agent can be used to control the viscosity of the final product. Since, as previously pointed out, this can be accomplished by the concentration of initiator, obviously a combination of initiator and small amounts of chain transfer agent is suitable. The combination is frequently advantageous since it reduces the quantity of the alkaline catalysts which are needed to produce a given molecular weight polymer. Typical chain transfer agents include chloroform, acetanilide, propionamide, N-methyl acetamide, phthalamide, diphenylamine, mercaptans, phenols, alcohols, sodium N-phenyl sulfanilate and the like.

A reaction temperature as low as −100° C. may be employed provided the solvent for the system is a liquid at the reaction temperature. It is preferred to add the initiator to the solution of the monomer at a temperature within the range from about −80° C. to about +10°. After a short induction period which varies depending upon the nature of the monomer, the initiator, the temperature of the system, and the like, the reaction solution suddenly becomes viscous. The course of the reaction can be observed by a rise in temperature. Usually the temperature increases during the course of the reaction to from about −10° to about +90° C. Freshly distilled solvent and monomer are employed to insure purity of the reaction system, exclusion of water, and the like. Nitrogen or other inert gas may be employed above the reaction mixture to exclude oxygen, carbon dioxide, moisture, etc.

The main advantage of the present process is the formation of essentially colorless polymer solutions which are directly usable without further intermediate steps. Thus, the resulting polymer solution from the process can be spun without further purification and without the necessity of precipitating the polymer, washing it, and redissolving it. At times the formed polymer solution may need further dilution or concentration. However, the amount of solvent in the polymerization can be regulated to produce polymer in a concentration ready for any desired shaping process, since the amount of solvent in the polymerization mixture has little effect on the reaction.

In addition to the above, the present process provides a method for producing block copolymers. If a block copolymer is desired, a monomer is anionically polymerized in the homogeneous system as described. After all the monomer has been converted into polymer, another monomer with somewhat higher activity (i.e., a higher $\sigma^*$ number) is added to the homogeneous reaction mixture and, since no termination reaction has taken place, the monomer chains of the first monomer are prolonged by addition polymerization of the new monomer. Of course, it is to be understood that to this block copolymer so formed a third or fourth monomer with higher activity can be added, thus forming block copolymers with three or four different repeated structural units.

It has been further demonstrated how a certain desired degree of polymerization with an excellent yield can be predicted; in other words, the starting mixture can be composed such that a certain concentration of the polymer with the desired molecular weight results from the process. This, together with the excellent color of the polymer makes the process of the present invention a most practical method for the preparation of vinylidene fibers. Furthermore, it provides a means of polymerizing vinylidene compounds in homogeneous systems, yielding solutions of the polymer which can be processed into coatings, films, filaments, tapes, ribbons, bristles, flakes, pellets, fibers, etc. Such articles are, as pointed out before, of excellent color; better than the color of vinylidene polymers produced commercially today. In addition, the present process can be carried out in a continuous manner.

Many equivalent modifications will be apparent to those skilled in the art from a reading of the above without a departure from the inventive scope.

What is claimed is:

1. A process for polymerizing to a fiber-forming molecular weight a vinylidene monomer of the class consisting of

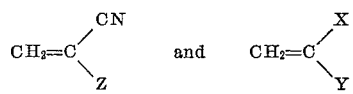

wherein —X is a member of the class consisting of

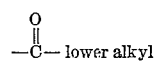

and —CHO, Y is a member of the class consisting of hydrogen, lower alkyl and phenyl and Z is a member of the class consisting of hydrogen and phenyl which comprises agitating at a temperature within a range of from about −100° C. to about +10° C., until a period of rapid temperature rise is observed, a solution of the said monomer and an alkaline salt from the class consisting of an alkali cyanide, an alkali earth cyanide, an alkali sulfide, an alkali earth sulfide, an alkali hydrosulfide, and alkali earth hydrosulfide, an alkali phenoxide, an alkali phthalamide, an organic quaternary ammonium hydroxide, an alkali hydroxide, an alkali mercaptide, an alkali thiophenoxide, an alkali succinimide, an alkali dimercaptide and an alkali diphenoxide, the solvent of the said solution being essentially anhydrous, free of components containing active hydrogen and capable of dissolving the polymer formed.

2. A process for polymerizing to a fiber-forming molecular weight a vinylidene monomer of the class consisting of

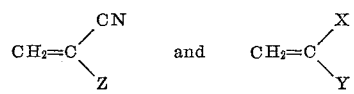

wherein —X is a member of the class consisting of

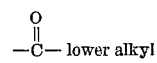

and —CHO, Y is a member of the class consisting of hydrogen, lower alkyl and phenyl and Z is a member of the class consisting of hydrogen and phenyl which comprises agitating at a temperature within a range of from about −100° C. to about +10° C., until a period of rapid temperature rise is observed, a solution of the said monomer and an alkaline salt from the class consisting of an alkali cyanide, an alkali earth cyanide, an alkali sulfide, an alkali earth sulfide, an alkali hydrosulfide, an alkali earth hydrosulfide, an alkali phenoxide, an alkali phthalimide, an organic quaternary ammonium hydroxide, an alkali hydroxide, and alkali mercaptide, an alkali thiophenoxide, an alkali succinimide, an alkali dimercaptide and an alkali diphenoxide, the solvent of the said solution being a member of the class consisting of dimethylformamide, dimethylacetamide and dimethylsulfoxide.

3. A process of forming a filament which comprises dry spinning the solution formed from the process of claim 1.

4. The process of claim 1 wherein the vinylidene monomer is acrylonitrile.

5. The process of claim 1 wherein the monomer is methacrolein.

6. The process of claim 1 wherein the monomer is methyl vinyl ketone.

7. The process of claim 1 wherein the alkaline salt is alkali cyanide.

8. The process of claim 1 wherein the alkaline salt is alkali sulfide.

9. The process of claim 1 wherein the alkaline salt is alkali hydrosulfide.

10. The process of claim 1 wherein the alkaline salt is alkali phenoxide.

11. The process of claim 1 wherein the alkaline salt is alkali phthalimide.

References Cited in the file of this patent

UNITED STATES PATENTS

| | | |
|---|---|---|
| 2,140,921 | Rein | Dec. 20, 1938 |
| 2,212,894 | Allen | Aug. 27, 1940 |
| 2,528,710 | Richards | Nov. 7, 1950 |
| 2,608,555 | Bullitt | Aug. 26, 1952 |
| 2,809,185 | Hearne | Oct. 8, 1957 |